(12) United States Patent
Kawamura et al.

(10) Patent No.: US 7,288,889 B2
(45) Date of Patent: Oct. 30, 2007

(54) BA-BASED BLUE PHOSPHOR MATERIAL PROVIDED WITH A PARTICLE SURFACE COATING AND PLASMA DISPLAY PANEL USING THE SAME

(75) Inventors: Hiroyuki Kawamura, Osaka (JP); Masaki Aoki, Osaka (JP); Kazuhiko Sugimoto, Kyoto (JP); Mitsuhiro Otani, Osaka (JP); Junichi Hibino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 313 days.

(21) Appl. No.: 10/451,024

(22) PCT Filed: Sep. 11, 2002

(86) PCT No.: PCT/JP02/09261

§ 371 (c)(1),
(2), (4) Date: Jun. 19, 2003

(87) PCT Pub. No.: WO03/025088

PCT Pub. Date: Mar. 27, 2003

(65) Prior Publication Data

US 2004/0043692 A1    Mar. 4, 2004

(30) Foreign Application Priority Data

Sep. 12, 2001   (JP) ............................. 2001-276300

(51) Int. Cl.
*H01J 17/49* (2006.01)
*H01J 1/62* (2006.01)
*H01J 63/04* (2006.01)

(52) U.S. Cl. ...................... 313/582; 313/486; 313/485; 313/487

(58) Field of Classification Search ........ 313/484–487; 427/66, 67; 252/301.4 R, 301.6 R, 301.17
See application file for complete search history.

(56) References Cited

U.S. PATENT DOCUMENTS 5,382,452 A * 1/1995 Bruno et al. ............... 427/67

(Continued)

FOREIGN PATENT DOCUMENTS

DE    199 37 420 C1    12/2000

(Continued)

OTHER PUBLICATIONS

Justel, T., et al., "Optimization of Luminescent Materials for Plasma Display Panels", Research News Advanced Materials, XP-002438167, 2000, pp. 527-530, vol. 12 No. 7, WILEY-VCH.

(Continued)

*Primary Examiner*—Mariceli Santiago
(74) *Attorney, Agent, or Firm*—McDermott Will & Emery LLP

(57) ABSTRACT

A phosphor in which water adsorption onto the surface of a blue phosphor is inhibited, luminance degradation and chromaticity shift of the phosphor is decreased, or discharge characteristics thereof is improved, and a plasma display device using the phosphor. In phosphor layers used for plasma display, selectively coating at least the vicinity of the sides of planes of mirror symmetry containing Ba atoms in a blue phosphor with an oxide or a fluorine-containing oxide inhibits water adsorption onto the surface of the blue phosphor, decreases luminance degradation and chromacity shift of a phosphor, or improves discharge characteristics thereof.

10 Claims, 5 Drawing Sheets

U.S. PATENT DOCUMENTS

| | | | |
|---|---|---|---|
| 5,518,808 A * | 5/1996 | Bruno et al. | 252/301.4 R |
| 5,879,586 A * | 3/1999 | Kitamura et al. | 252/301.4 R |
| 6,180,029 B1 * | 1/2001 | Hampden-Smith et al. | 252/301.4 R |
| 6,197,218 B1 * | 3/2001 | Hampden-Smith et al. | 252/301.4 R |
| 6,614,165 B1 * | 9/2003 | Aoki et al. | 313/485 |
| 2003/0059531 A1 * | 3/2003 | Raukas et al. | 427/215 |
| 2004/0183429 A1 * | 9/2004 | Yonezawa et al. | 313/495 |

FOREIGN PATENT DOCUMENTS

| | | |
|---|---|---|
| EP | 1 030 339 A1 | 8/2000 |
| JP | 10-125240 | 5/1998 |
| JP | 11-172244 | 6/1999 |
| JP | 2000-34478 | 2/2000 |
| JP | 2001-55567 | 2/2001 |
| JP | 2001-89759 | 4/2001 |

OTHER PUBLICATIONS

Supplementary European Search Report issued in European Patent Application No. EP 02 76 5479 dated Jul. 9, 2007.

* cited by examiner

BA-BASED BLUE PHOSPHOR MATERIAL PROVIDED WITH A PARTICLE SURFACE COATING AND PLASMA DISPLAY PANEL USING THE SAME

TECHNICAL FIELD

The present invention relates to a plasma display device used for image display on a television, or other equipment, and particularly to a phosphor constituting phosphor layers for use in the plasma display device.

BACKGROUND ART

Among color display devices used for image display on a computer screen or television, a display device using a plasma display panel (hereinafter referred to as a "PDP") has recently been drawing attention, as a large, thin, and lightweight color display device.

A plasma display device using a PDP performs additive color mixing of so-called three primary colors (red, green, and blue) to provide full-color display. For the full-color display, a plasma display device has phosphor layers for emitting the respective three primary colors, i.e. red (R), green (G), and blue (B). Phosphor particles constituting these phosphor layers are exited by ultraviolet light generated in discharge cells of the PDP to generate visible light of respective colors.

Known as compounds used for phosphors are $(YGd)BO_3$:$Eu^{3+}$ and $Y_2O_3$:$Eu^{3+}$ for red emission, $Zn_2SiO_4$:$Mn^{2+}$ for green emission, and $BaMgAl_{10}O_{17}$:$Eu^{2+}$ for blue emission. Each of these phosphors is fabricated by mixing specific materials and then firing the mixture at high temperatures of at least 1,000° C. for solid-phase reaction (see "Phosphor Handbook" p.219 and 225, Ohmsha, for example). The phosphor particles obtained by this firing are used after they are milled and classified (average diameter of red and green particles: 2 to 5 µm, average diameter of blue particles: 3 to 10 µm). The phosphor particles are milled and classified for the following reason. In general, when phosphor layers are formed on a PDP, a technique of screen-printing a paste of phosphor particles of each color is used. In application of the paste, the smaller and more uniform diameters of phosphor particles (i.e. a uniform particle size distribution) can easily provide the smoother coated surface. In other words, when phosphor particles have smaller and more uniform diameters and shapes approximating to a sphere, the coated surface is smoother. The smoother coated surface increases the packing density of the phosphor particles in a phosphor layer and the emission surface area of the particles, thus increasing the luminance of the plasma display device.

However, the smaller diameters of phosphor particles increase the specific surface area of the phosphor and thus defects on the surface of the phosphor. For this reason, a large quantity of water, carbonic acid gas, or hydrocarbon-containing organic substances are prone to adhere to the surface of the phosphor. Especially for a blue phosphor made of $Ba_{1-x}MgAl_{10}O_{17}$:$Eu_x$ or $Ba_{1-x-y}Sr_yMgAl_{10}O_{17}$:$Eu_x$, crystal structures thereof has layer structures each made of three layers, i.e. BaO, $4Al_2O_3$, and $MgAl_2O_4$ (where Eu and Sr substitute for part of Ba). It is known that, among the layers, there is oxygen (O) vacancy in layers containing Ba atoms (Ba-O layers) (see "Display and Imaging", 1999, vol. 7, pp 225-234 and "OYO BUTSURI (Applied Physics)", vol. 70, No.3, 2001, pp310, for example). For this reason, water existing in air is selectively adsorbed onto the surface of such a Ba-O layer. As a result, because a large quantity of water is released onto a panel in a panel manufacturing process, the water reacts with the phosphor and MgO during discharge. This poses problems of luminance degradation and chromaticity shift (color shift and image burn caused by the chromaticity shift), or decrease in drive voltage margin and increase in discharge voltage.

On the other hand, disclosed method to address these problems is coating the entire surface of a phosphor with a crystal thin layer made of a material, such as $Al_2O_3$, in order to recover the defects in Ba—O layers (see Japanese Patent Unexamined Publication No. 2001-55567, for example). However, coating the entire surface of a phosphor poses another problem: the thin layer of coating absorbs ultraviolet light and thus decreases the emission luminance of the phosphor.

In order to address these problems, the present invention aims to inhibit water adsorption onto the surface of a blue phosphor, decrease luminance degradation and chromaticity shift of a phosphor, or improve discharge characteristics thereof.

DISCLOSURE OF THE INVENTION

In order to address these problems, a phosphor, a method of fabricating the phosphor, and a plasma display device of the present invention comprise the following components.

In other words, a phosphor of the present invention includes a blue phosphor having a crystal structure of $Ba_{1-x}MgAl_{10}O_{17}$:$Eu_x$ or $Ba_{1-x-y}Sr_yMgAl_{10}O_{17}$:$Eu_x$ and exited by ultraviolet light to emit visible light. In the blue phosphor, the vicinity of the side faces of layers containing Ba atoms is coated with an oxide or a fluorine-containing oxide. This structure can inhibit water adsorption onto the surface of the blue phosphor, decrease luminance degradation and chromaticity shift of the phosphor, or improve discharge characteristics thereof.

Further, a method of manufacturing a phosphor of the present invention includes: a mixed solution fabrication step in which a metal salt or an organometalic salt containing elements constituting a blue phosphor is mixed with an aqueous medium, to fabricate a mixed solution; a step of drying the mixed solution and thereafter firing the mixture, to fabricate a phosphor of $Ba_{1-x}MgAl_{10}O_{17}$:$Eu_x$ or $Ba_{1-x-y}Sr_yMgAl_{10}O_{17}$:$Eu_x$; surface-treating this phosphor in an acescent aqueous solution; and coating the vicinity of the side faces of layers containing Ba atoms in this phosphor with $SiO_2$, $Al_2O_3$, ZnO, $MgAl_2O_4$, $La_2O_3$, $LaPO_4$, $Zn_2SiO_4$, $Si(O—F)_2$, $La_2(O—F)_3$, or $Al_2(O—F)_3$. Adding a step of coating the side faces of Ba—O layers to the process of fabricating a blue phosphor can provide a phosphor durable against water and carbonic acid gas, without causing degradation of the luminance of the blue phosphor.

Further, a plasma display device of the present invention has a plasma display panel in which a plurality of discharge cells of one or a plurality of colors are disposed in arrays, phosphor layers having a color corresponding to the respective discharge cells are disposed, and the phosphor layers are excited by ultraviolet light to emit light. The phosphor layers include blue phosphor layers. The blue phosphor constituting each blue phosphor layer is made of a compound represented by $Ba_{1-x}MgAl_{10}O_{17}$:$Eu_x$ or $Ba_{1-x-y}Sr_yMgAl_{10}O_{17}$:$Eu_x$ in which the vicinity of the side faces of layers containing Ba atoms is coated with at least one material of $SiO_2$, $Al_2O_3$, ZnO, $MgAl_2O_4$, $La_2O_3$, $LaPO_4$, $Zn_2SiO_4$, $Si(O—F)_2$, $La_2(O—F)_3$, and $Al_2(O—F)_3$. This structure can provide a plasma display device having improved luminance, inhibited luminance degradation and chromaticity shift, and excellent luminance characteristics.

DETAILED DESCRIPTION OF PREFERRED EMBODIMENT

First, a description is provided of an advantage of selectively coating the side faces of Ba—O layers in a blue phosphor with an oxide or a fluorine-containing oxide.

A phosphor for use in a PDP or other equipment is fabricated by a solid-phase reaction method, an aqueous solution reaction method, or other methods. When a phosphor has smaller particle diameters, defects are prone to occur. Especially for the solid-phase reaction method, it is known that milling a phosphor after firing leads many defects. It is also known that ultraviolet light having a wavelength of 147 nm generated by discharge in driving a panel causes defects in a phosphor (see "Electronic Information and Communication Institute, Technical Research Report", EID99-94, Jan. 27, 2000, for example).

Especially for $BaMgAl_{10}O_{17}:Eu_x$, a blue phosphor, it is known that the phosphor itself has oxygen vacancy especially in Ba—O layers thereof (see "OYO BUTSURI (Applied Physics)" vol. 70, No. 3, 2001, pp310, for example).

Figure 6:
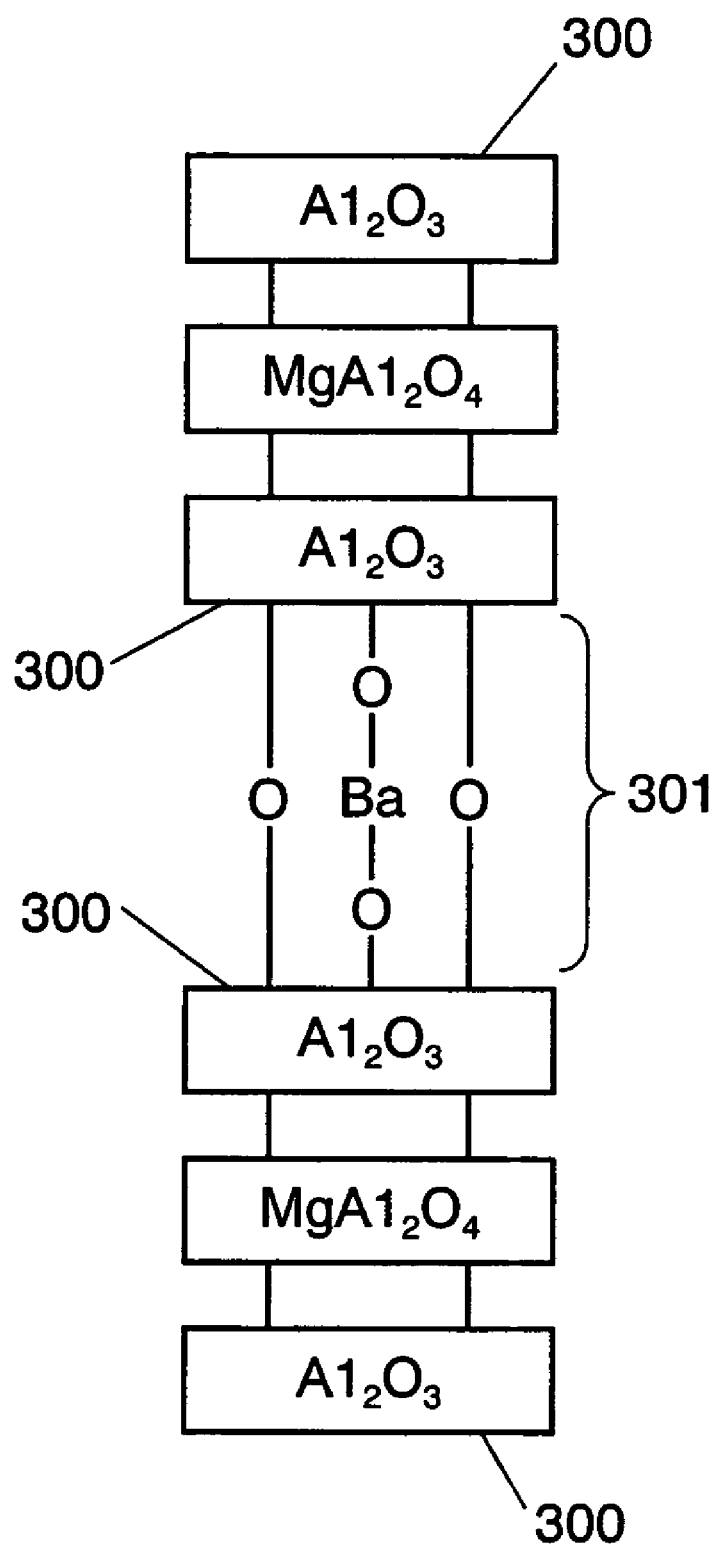
FIG. 6 is a schematic diagram showing an atomic structure of a blue phosphor in accordance with the exemplary embodiment of the present invention.

FIG. 6 is a diagram schematically showing a structure of a Ba—O layer in $BaMgAl_{10}O_{17}:Eu$, a blue phosphor. This Ba—O layer is structured as substantially a hexagon plate and made of planes of mirror symmetry 300, i.e. the surfaces of a C-axis, and sides 301, i.e. side faces of planes of mirror symmetry 300. For a conventional blue phosphor, existence of this oxygen vacancy itself has been considered as a cause of luminance degradation. In other words, it has been considered that the degradation is caused by defects. Such defects are caused by impact of ions generated in driving a panel on a phosphor and by ultraviolet light having a wavelength of 147 nm. However, inventors of the present invention have found that the luminance degradation is not only essentially caused by existence of such defects but is caused by selective adsorption of water or carbonic acid gas to defects in Ba—O layers, especially to the defects in the vicinity of sides 301 of planes of mirror symmetry 300. By irradiating the adsorption with ultraviolet light or ions, the phosphor reacts with the water, thus causing luminance degradation and color shift. In other words, the inventors have come to know that adsorption of water or carbonic acid gas to Ba—O layers in a blue phosphor causes a various kinds of degradation. Likelihood of selective water adsorption onto Ba—O layers is supported by the fact that heat of hydration of a substance having Ba—O bonds has a negative value, −24.48 Kcal/mol (see "Metallic Oxide and Composite Oxide", Kodansha Ltd., Publishers, Apr. 20, 1978, pp41).

Based on this knowledge, in accordance with the present invention, an oxide or a fluorine-containing oxide, such as $SiO_2$, $Al_{12}O_3$, $ZnO$, $MgAl_2O_4$, $La_2O_3$, $LaPO_4$, $Zn_2SiO_4$, $Si(O—F)_2$, $La_2(O—F)_3$, and $Al_2(O—F)_3$, is selectively adsorbed only onto the side faces of Ba—O layers, i.e. the vicinity of the sides of planes of mirror symmetry, to which water is adsorbed in a blue phosphor. This selective adsorption of an oxide or a fluorine-containing oxide prevents degradation of the blue phosphor in a panel manufacturing process and in driving a panel, without causing degradation of the luminance of the blue phosphor.

The oxide or fluorine-containing oxide is deposited only in the vicinity of the sides of planes of mirror symmetry in Ba—O layers for the following reason. When a blue phosphor is introduced, dispersed and mixed in a mixed solution made by dispersing metal alkoxide or acetylacetone having a low concentration in an alcoholic solution containing water in an amount up to 0.025% (absolute alcohol), water ($H_2O$) adsorbed onto the sides of planes of mirror symmetry, i.e. the side faces of Ba—O layers, and the metal alkoxide locally react with (hydrolyze) each other to deposit a metallic oxide. This reaction is expressed by the following formula (1) using $SiO_2$ as an example.

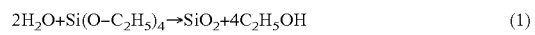

$$2H_2O + Si(O-C_2H_5)_4 \rightarrow SiO_2 + 4C_2H_5OH \quad (1)$$

According to this formula (1), $SiO_2$ can selectively adhere to the vicinity of the sides of planes of mirror symmetry in Ba—O layers onto which water is adsorbed.

Methods of manufacturing a phosphor of the present invention are described hereinafter.

Considered as methods of manufacturing a phosphor itself are a conventional solid-phase firing method using a fluxing agent, a method of heat-treating a precursor of a phosphor fabricated by a co-precipitation method of adding an alkali or other substances to an aqueous solution for precipitation, and a liquid spray method of spraying an aqueous solution containing phosphor materials into a high-temperature furnace. It has been found that coating the vicinity of Ba—O layers is effective, in a phosphor fabricated by any method.

Now, as an example of a method of fabricating a phosphor, a description is provided of preparation of a blue phosphor using a solid-phase reaction method. Nitrates, such as $Ba(NO_3)_2$, $Mg(NO_3)_2$, $Al(NO_3)_2$, and $Eu_2(NO_3)_2$, as materials, are mixed with a small amount of fluxing agent ($AlF_3$ or $BaCl_2$) as a sintering agent. The mixture is fired at a temperature of 1,400° C. for two hours. Then, the fired mixture is milled and classified. Next, the milled and classified mixture is fired at a temperature of 1,500° C. for two hours in a reducing atmosphere ($H_2$ (5%)-$N_2$ matrix) and milled and classified again, to provide a phosphor.

When a phosphor is fabricated from an aqueous solution (liquid-phase method), the above nitrates are dissolved in water, an alkali is added thereto, to provide a co-precipitate (hydrate). The hydrate is hydro-thermally synthesized (crystallized in an autoclave), fired in air, or sprayed into a high-temperature furnace, to provide fine particles. The fine particles are fired at a temperature of 1,500° C. for two hours in a reducing atmosphere ($H_2$ (5%)-$N_2$ matrix), to provide a phosphor.

Next, a description is provided of a method of coating the vicinity of the sides of planes of mirror symmetry in Ba—O layers of a blue phosphor obtained in this manner with an oxide or a fluorine-containing oxide.

$Ba_{1-x}MgAl_{10}O_{17}:Eu_x$ or $Ba_{1-x-y}Sr_yMgAl_{10}O_{17}:Eu_x$ is used as a blue phosphor fabricated by the above methods. Used as a solvent are those containing water in an amount up to 0.025%, e.g. absolute alcohols, and hydrophobic solvent, e.g. toluene, dimethyl benzene, and hexane. Metal alkoxide or silicofluoric acid ($H_2SiF_6$) is used as an organic compound containing Si, Al, Zn, P, La, or F for a material of an oxide or a fluorine-containing oxide. The metal alkoxide includes $[M(O-R)_n]$ where M is at least one of Si, Al, Zn, La, and P, R is an alkyl group, and $R=C_nH_{2n+1}$ (n being an integer or a metallic salt of acetylacetate), $[M(C_5H_7O_2)_n]$ where M is Si, Al, Zn, La, P, or a metallic salt of hexafluoro acetylacetone, and $[M(C_5HF_6O_2)_n]$ where M is Si, Al, Zn, P, or La and n is an integer. The blue phosphor, solvent, and organic compound including Si, Al, Zn, P, La, or F are mixed and stirred to cause hydrolysis in the vicinity of Ba—O layers in the blue phosphor containing $BaMgAl_{10}O_{17}:Eu$ and locally form a coating layer containing an oxide or a fluorine-containing oxide.

It is preferable that the amount of coating is up to 0.01% of the phosphor in consideration of luminance degradation thereof. When water content in a solvent exceeds 0.025%, hydrolysis occurs in the mixed solution and hinders adhesion to the phosphor. For this reason, it is preferable that the water concentration is up to 0.025%. Next, after the mixed solution is filtered and then dried at temperatures of at least 1,000° C., and the mixture is fired at temperatures ranging from 300 to 600° C. Thus, the vicinity of the sides of planes of mirror symmetry in Ba—O layers on the surface of $BaMgAl_{10}O_{17}:Eu$ can selectively be coated with an oxide or a fluorine-containing oxide. Besides the above compounds, usable compounds containing Si, Al, Zn, P, or La include cyclopentadienyl compounds and dipivaloyl methane compounds.

When a phosphor is coated with such an oxide as $MgAl_2O_4$, $Zn_2SiO_4$, and $LaPO_4$, two kinds of metallic alkoxide or acetylacetone are weighed in a molar ratio of the above each compound and introduced into a non-aqueous solvent. The mixture is mixed together with a blue phosphor by a ball mill or stirrer, and hydrolyzed by water selectively adsorbed in the vicinity of the sides of planes of mirror symmetry in Ba—O layers. Thus, the oxide can be formed on the side faces of the Ba—O layers.

Adding a step of coating the vicinity of the sides of planes of mirror symmetry in Ba—O layers to a conventional blue phosphor particle fabrication process in this manner can provide a water repellent phosphor resistant to water (i.e. durable against water and carbonic acid gas generated in a phosphor firing process, panel sealing process, panel aging process, or in driving a panel), without causing degradation of the luminance of the blue phosphor.

A plasma display device of the present invention has a PDP in which a plurality of discharge cells of one or a plurality of colors are disposed in arrays, phosphor layers having a color corresponding to the respective discharge cells are disposed, and the phosphor layers are excited by ultraviolet light to emit light. Each of the blue phosphor layers is made of blue phosphor particles having uniform particle size distribution in which the vicinity of the sides of planes of mirror symmetry in Ba—O layers is coated with an oxide or a fluorine-containing oxide.

The diameters of blue phosphor particles in which the side faces of Ba—O layers thereof are coated with a water repellent material are as small as 0.05 to 3 μm. The particle size distribution of the blue particles is excellent. Further, when each of the phosphor particles forming a phosphor layer has a spherical shape, the packing density of the layer increases. This increases the emission area of phosphor particles substantially contributing to light emission. Therefore, the luminance of a plasma display device is increased and a plasma display device that has inhibited luminance degradation and color shift and excellent luminance characteristics can be provided.

Now, it is more preferable that the average particle diameter of phosphor particles ranges from 0.1 to 2.0 μm. As to the particle size distribution, it is more preferable that the maximum particle size is at most four times the mean value and the minimum value is at least a quarter of the mean value. In a phosphor particle, the area ultraviolet light reaches is as shallow as several hundred nm from the surface of the particle and only the surface thereof emits light. When the diameters of these phosphor particles are up to 2.0 μm, the surface area of particles contributing to light emission increases and the emission efficiency of the phosphor layer is kept high. When the diameters of phosphor particles are at least 3.0 μm, the thickness of the phosphor layer must be at least 20 μm and a sufficient discharge space cannot be ensured. When the diameters of phosphor particles are up to 0.1 μm, defects are prone to occur and the luminance does not increase. It is desirable that the thickness of an oxide or fluorine-containing oxide coating a blue phosphor is set as small as possible if the coating is effective. For this reason, it is desirable that the amount of the coating material is up to 0.01 wt % of the phosphor.

When the thickness of a phosphor layer is set within the range of 8 to 25 times the average diameter of phosphor particles, a sufficient discharge space can be ensured while the emission efficiency of the phosphor layer is kept high. Therefore, the luminance of a plasma display device can be increased. Especially when the average particle diameter of a phosphor is up to 3 μm, this effect is greater (see "The Institute of Image Information and Television Engineers", IDY2000-317, pp32).

A specific example of phosphor particles usable for blue phosphor layers in a plasma display device is made of a compound represented by $Ba_{1-x}MgAl_{10}O_{17}:Eu_x$ or $Ba_{1-x-y}Sr_yMgAl_{10}O_{17}:Eu_x$. When values X and Y in these compounds are such that $0.03 \leq X \leq 0.20$ and $0.1 \leq Y \leq 0.5$, the blue phosphor exhibits an excellent luminance and resistance to luminance degradation. Thus, satisfying these conditions is preferable.

A specific example of phosphor particles usable for red phosphor layers in a plasma display device is made of a compound represented by $Y_{2-x}:Eu_x$ or $(YGd)_{1-x}BO_3:Eu_x$. When value X in the compounds for the red phosphor is such that $0.05 \leq X 0.20$, the red phosphor exhibits an excellent luminance and resistance to luminance degradation. Thus, satisfying this condition is preferable.

A specific example of phosphor particles usable for green phosphor layers in a plasma display device is made of a compound represented by $Ba_{1-x}Al_{12}O_{19}:Mn_x$ or $Zn_{2-x}SiO_4:Mn_x$. When value X in the compounds for the green phosphor is such that $0.01 \leq X \leq 0.10$, the green phosphor exhibits an excellent luminance and resistance to luminance degradation. Thus, satisfying this condition is preferable.

A plasma display device in accordance with one exemplary embodiment of the present invention is described hereinafter with reference to the accompanying drawings.

Figure 1:
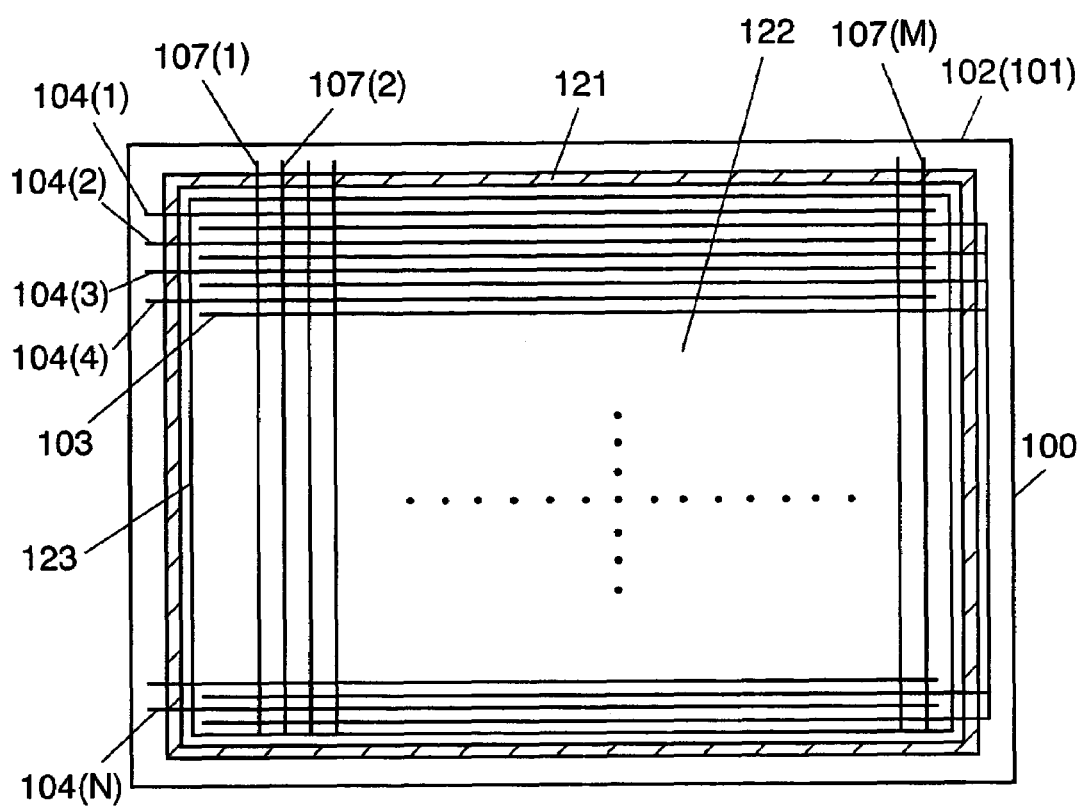
FIG. 1 is a plan view of a plasma display panel (PDP) in accordance with an exemplary embodiment of the present invention, schematically showing a structure of electrode arrangement thereof.
Figure 2:
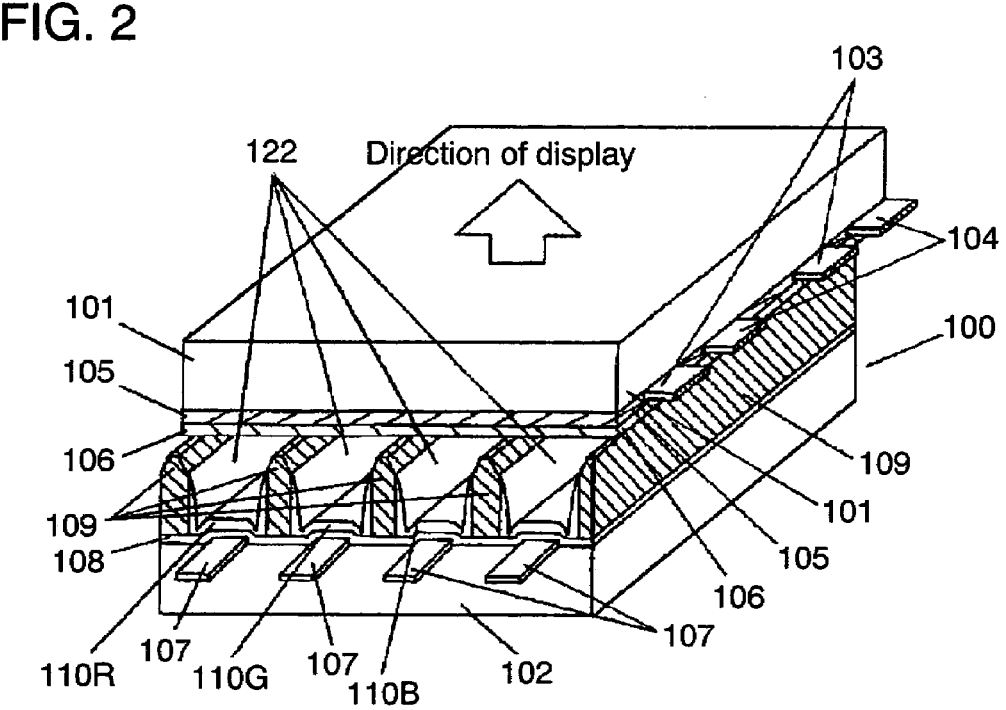
FIG. 2 is a sectional view, in perspective, showing a structure of an image display area of the PDP in accordance with the exemplary embodiment of the present invention.

FIG. 1 is a schematic plan view of a PDP, showing a structure of electrode arrangement. FIG. 2 is a partially sectional view in perspective of an image display area of the PDP. In FIG. 1, the number of display electrodes, display scan electrodes, and address electrodes is reduced to facilitate explanation. With reference to these FIGS. 1 and 2, the structure of a PDP is described.

As shown in FIG. 1, PDP 100 includes N display electrodes 103 and N display scan electrodes 104 (Nth electrode indicated by N) that are arranged on front glass substrate 101 (not shown), M address electrodes 107 (Mth electrode indicated by M) that are arranged on rear glass substrate 102, and hermetic seal layer 121 shown by oblique lines. The PDP has an electrode matrix having a three-electrode structure made of respective electrodes 103, 104, and 107. Cells are formed at the respective intersections of display scan electrodes 104 and address electrodes 107.

As shown in FIG. 2, this PDP 100 is structured so that a front panel and a rear panel are sealed together and discharge space 122 formed between the front panel and the rear panel is filled with a discharge gas. In the front panel, display electrodes 103, display scan electrodes 104, dielectric glass layer 105, and MgO protective layer 106 are disposed on a principal surface of front glass substrate 101. In the rear panel, address electrodes 107, dielectric glass layer 108, barrier ribs 109, and phosphor layers 110R, 110G and 110B are disposed on a principal surface of rear glass substrate 102. Phosphor layers 110B is formed of phosphor particles in which the vicinity of the side faces of Ba—O layers are coated with an oxide or a fluorine-containing oxide.

Figure 3:
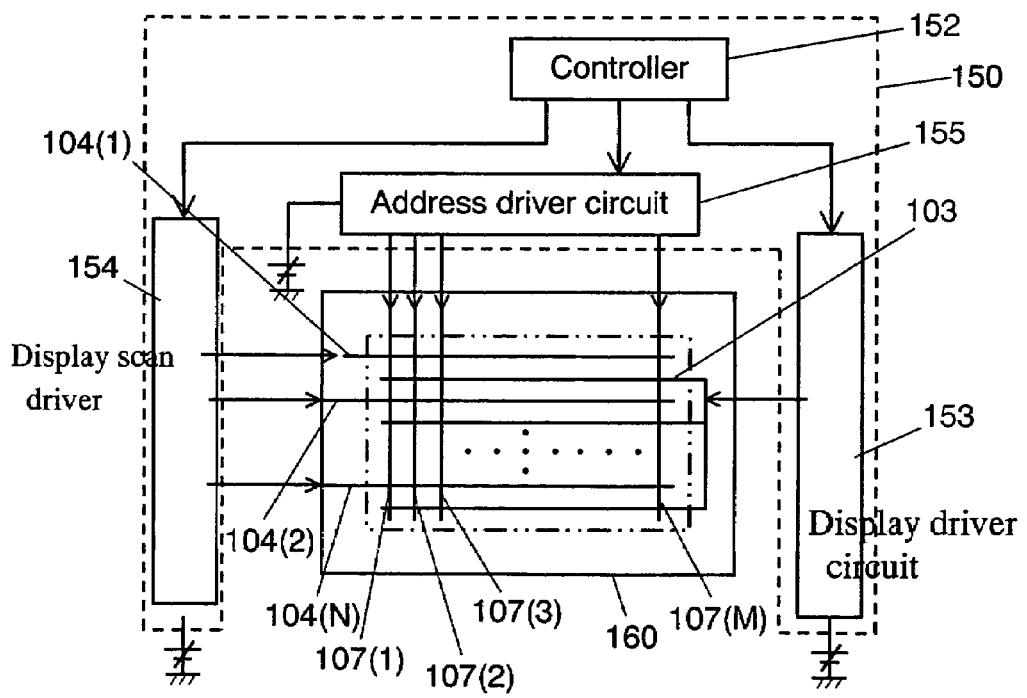
FIG. 3 is a block diagram of a plasma display device in accordance with the exemplary embodiment of the present invention.

When an image is displayed on a plasma display device, first, display driver circuit 153, display scan driver circuit 154, and address driver circuit 155 are connected to PDP 100, as shown FIG. 3. Next, according to control of controller 152, a signal voltage is applied across display scan electrode 104 and address electrode 107 of a cell to be lit for address discharge therebetween. Then, a pulse voltage is applied across display electrode 103 and display scan electrode 104 for sustain discharge. This sustain discharge generates ultraviolet light in the cell. The phosphor layer excited by this ultraviolet light emits light, thus lighting the cell. Combination of lit and unlit cells of the respective colors provides image display.

Next, a method of manufacturing this PDP 100 is described with reference to FIGS. 4 and 5.

(1) Production of Front Panel

First, N display electrodes 103 and N display scan electrodes 104 are arranged on front glass substrate 101 alternately, parallel to each other, like stripes. (In FIG. 2, only two of respective electrodes are shown for simplicity.) Thereafter, the electrodes are covered with dielectric glass layer 105, and MgO protective layer 106 is further formed over the surface of the dielectric glass layer. Display electrodes 103 and display scan electrodes 104 are made of silver. These electrodes are formed by applying a silver paste for electrodes by screen-printing and firing the paste.

Dielectric glass layer 105 is formed by applying a paste containing lead glass material by screen-printing, and firing the paste at a specified temperature for a specified period of time (e.g. at 56° C. for 20 min.) so that the layer has a specified thickness (approx. 20 µm). Examples of the paste containing lead glass material to be used include a mixture of PbO (70 wt %), $B_2O_3$ (15 wt %), $SiO_2$ (10 wt %), $Al_2O_3$ (5 wt %) and an organic binder (α-terpineol containing 10% of ethyl cellulose dissolved therein).

The organic binder contains a resin dissolved in an organic solvent. Acrylic resin can be used as a resin other than the ethyl cellulose, and n-butylcarbitol as an organic solvent. Further, a dispersion agent (e.g. glyceryl trileate) can be mixed into such an organic binder.

MgO protective layer 106 is made of magnesium oxide (MgO). The layer is formed by sputtering method or chemical vapor deposition (CVD) method, for example, to have a specified thickness (approx. 0.5 µm).

(2) Production of Rear Panel

First, M address electrodes 107 are formed in lines by screen-printing a silver paste for electrodes on rear glass substrate 102 and thereafter firing the paste. Next, dielectric glass layer 108 is formed by applying a paste containing lead glass material to the address electrodes by a screen-printing method. Barrier ribs 109 are formed by repeatedly applying the same paste containing lead glass material to the dielectric glass layer by the screen-printing method at a specified pitch and thereafter firing the paste. These barrier ribs 109 partition discharge space 122 into respective cells (unit emission area) in the direction of the lines.

Figure 4:
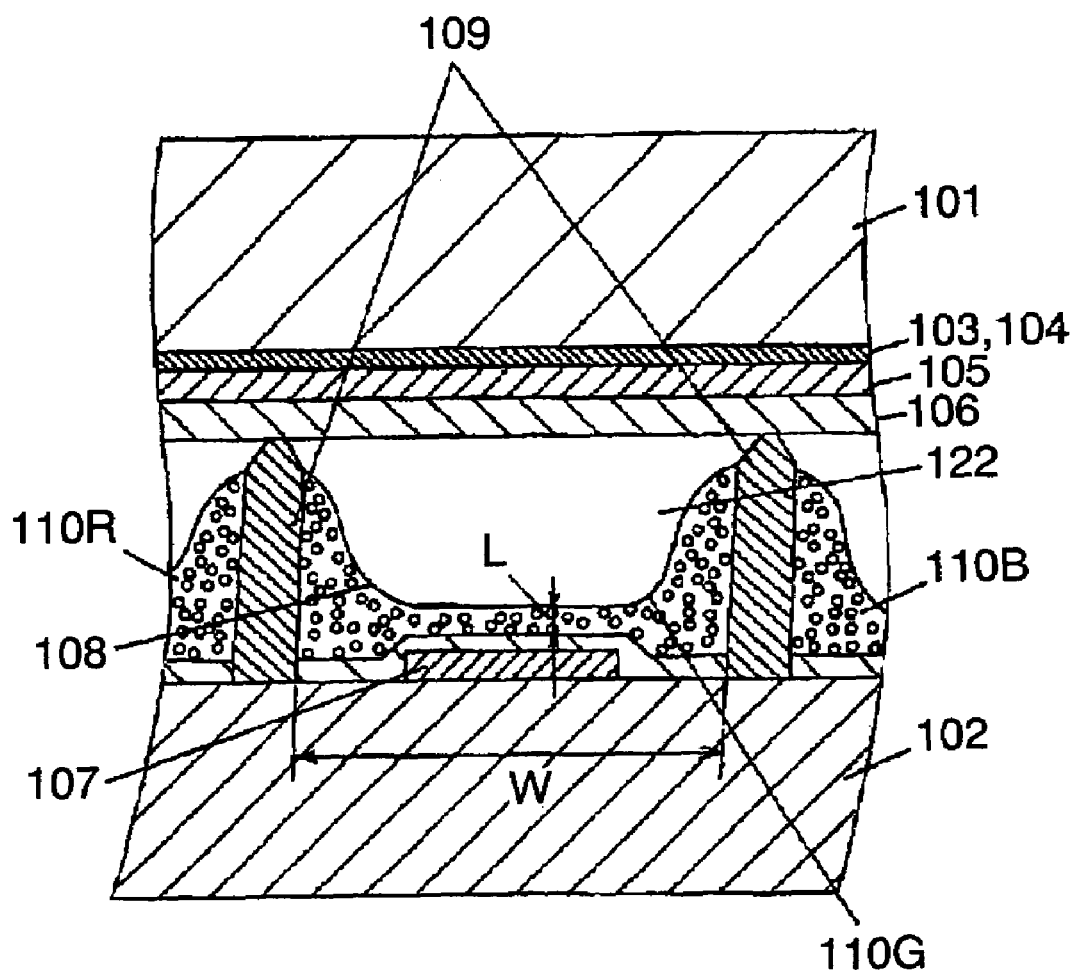
FIG. 4 is a sectional view of the image display area of the PDP in accordance with the exemplary embodiment of the present invention.

FIG. 4 is a partially sectional view of PDP 100. As shown in the drawing, interval dimension W between barrier ribs 109 is specified to a value ranging from approx. 130 to 240 µm, according to a HDTV screen having a diagonal size ranging from 32 to 50 in.

Paste-like phosphor ink made of red (R), green (G), or blue (B) phosphor particles and an organic binder is applied to grooves between barrier ribs 109, and fired at temperatures ranging from 400 to 590° C. to burn out the organic binder. Thus, phosphor layers 110R, 110G, and 110B in which phosphor particles of corresponding colors are bound are formed. In the blue phosphor particles, the side faces of Ba—O layers are coated with an oxide or a fluorine-containing oxide It is preferable that thickness L of each of these phosphor layers 110R, 110G, and 110B on address electrode 107 in the direction of lamination is approx. 8 to 25 times the average diameter of phosphor particles of each color. In other words, in order to ensure a certain luminance (emission efficiency) when a phosphor layer is irradiated with a specified amount of ultraviolet light, the phosphor layer needs to absorb ultraviolet light generated in the discharge space instead of allowing it to pass through. For this purpose, it is desirable that the phosphor layer has a thickness in which at least eight layers, preferably, approx. 20 layers of phosphor particles are laminated. For a thickness larger than that, the emission efficiency of the phosphor layer does not increase. This is because sufficiently large discharge space 122 cannot be ensured, for a thickness exceeding lamination of approx. 20 layers.

Phosphor particles having sufficiently small diameters and spherical shapes, like those obtained by hydrothermal synthesis or other methods, have a packing factor of the phosphor layer and a total surface area of the phosphor particles larger than those of phosphor particles having non-spherical shapes, even when the number of laminated layers are the same. As a result, phosphor particles having spherical shapes increase the surface area contributing to actual light emission of the phosphor layer and the emission efficiency.

(3) Production of PDP by Sealing Panels

The front panel and the rear panel produced in this manner are placed one on the other so that the respective electrodes on the front panel are orthogonal to the address electrodes on the rear panel. Sealing glass is inserted between the panels along the periphery thereof and fired at temperatures of approx. 450° C. for 10 to 20 min., for example, to from hermetical seal layer 121 (see FIG. 1) for sealing. Next, discharge space 122 is once evacuated to a high vacuum (e.g. $1.1 \times 10^{-4}$ Pa) and filled with a discharge gas (e.g. He—Xe or Ne—Xe inert gas) at a specified pressure, to provide PDP 100.

(4) Method of Forming Phosphor Layers

Figure 5:
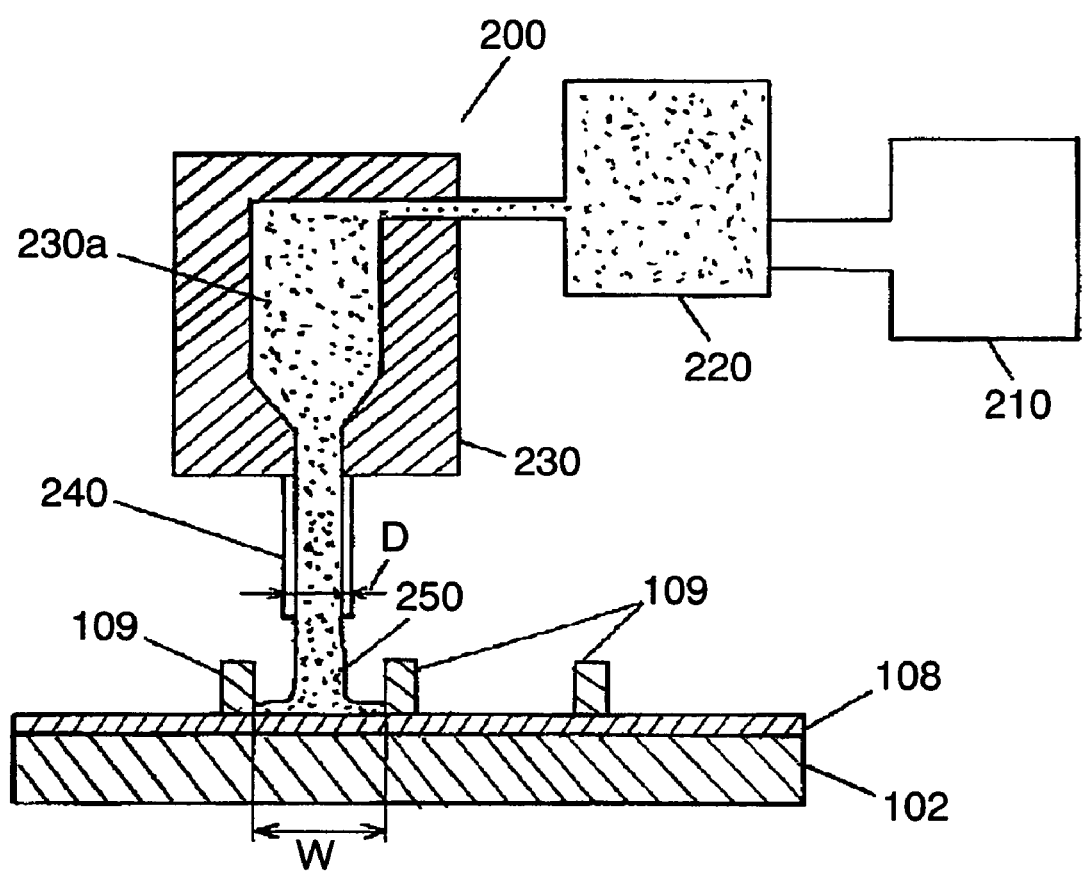
FIG. 5 is a schematic diagram showing a structure of an ink dispenser used when phosphor layers of the PDP in accordance with the exemplary embodiment of the present invention are formed.

FIG. 5 is a schematic diagram showing a structure of ink dispenser 200 for use in forming phosphor layers 100R, 110G, and 110B. As shown in FIG. 5, ink dispenser 200 includes server 210, pressure pump 220, and header 230. Phosphor ink is pressurized by pressure pump 220 and supplied from server 210 for storing the phosphor ink to header 230.

The ink dispenser is structured so that header 230 has ink chamber 230a and nozzle 240, and the phosphor ink pressurized and supplied to ink chamber 230a is continuously ejected from nozzle 240. It is desirable that bore diameter D of this nozzle 240 is set to at least 30 µm in order to prevent clogging of the nozzle. It is also desirable that bore diameter D is equal to or smaller than interval W between barrier ribs 109 (approx. 130 to 200 µm) in order to prevent displacement of a phosphor layer from the barrier ribs in application. Thus, bore diameter D is generally set to 30 to 130 µm.

Header 230 is structured to be driven lineally by a header scanning mechanism (not shown). Continuously ejecting phosphor ink 250 from nozzle 240 and scanning header 230 at the same time allows phosphor ink to be uniformly applied to the grooves between barrier ribs 109 on rear glass substrate 102. Viscosity of the phosphor ink used is kept within the range of 1,500 to 30,000 centipoises (CP) at a temperature of 25° C.

This server 210 also has a mixer (not shown). Mixing prevents precipitation of particles in phosphor ink. Header 230 is integrally formed with ink chamber 230a and nozzle 240 by performing machining and electric discharge machining on a metallic material.

The methods of forming phosphor layers are not limited to the above method. Other various kinds of usable methods include photolithography, screen-printing, and a method of disposing a film including phosphor particles mixed therein.

The phosphor ink is prepared by mixing phosphor particles of each color, a binder and a solvent so that the mixture has a viscosity ranging from 1,500 to 30,000 centipoises (CP). A surface-active agent, silica, a dispersion agent (0.1 to 5 wt %) can also be added, as required.

As a red phosphor included in this phosphor ink, a compound represented by $(Y,Gd)_{1-x}BO_3:Eu_x$ or $Y_{2-x}O_3:Eu_x$ is used. In these compounds, the element Eu substitutes for part of the element Y constituting the matrix of the compounds. It is preferable that the substitution value X of the element Eu with respect to the element Y is $0.05 \leq X \leq 0.20$. For a substitution value larger than this value, the phosphor has a high luminance but considerable luminance degradation. For this reason, it is considered that such a red phosphor cannot be used practically. For a substitution value smaller than this value, the composition ratio of Eu mainly emitting light is small and thus the luminance decreases. Therefore, such a red phosphor cannot be used as a phosphor.

As a green phosphor, a compound represented by $Ba_{1-x}Al_{12}O_{19}:Mn_x$ or $Zn_{2-x}SiO_4:Mn_x$ is used. $Ba_{1-x}Al_{12}O_{19}:Mn_x$ is a compound in which the element Mn substitutes for part of the element Ba constituting the matrix of the compound. $Zn_{2-x}SiO_4:Mn_x$ is a compound in which the element Mn substitutes for part of the element Zn constituting the matrix of the compound. It is preferable that the substitution value X of the element Mn with respect to the element Ba or Zn is 0.0 $1 \leq X \leq 0.10$ for the same reason as described in the case of the red phosphor.

As a blue phosphor, a compound represented by $Ba_{1-x}MgAl_{10}O_{17}:Eu_x$ or $Ba_{1-x-y}Sr_yMgAl_{10}O_{17}:Eu_x$ is used. $Ba_{1-x}MgAl_{10}O_{17}:Eu_x$ and $Ba_{1-x-y}Sr_yMgAl_{10}O_{17}:Eu_x$ are compounds in which the element Eu or Sr substitutes for part of the element Ba constituting the matrix of the compounds. It is preferable that the substitution value X of the element Eu and substitution value Y of the element Sr with respect to the element Ba are $0.03 \leq X \leq 0.20$ and $0.1 \leq Y \leq 0.5$, respectively, for the same reason as described above.

Ethyl cellulose or acrylic resin can be used as a binder included in phosphor ink (in an amount of 0.1 to 10 wt % of the ink) and α-terpineol or n-butylcarbitol can be used as a solvent. Polymers, such as PMA and PVA, can also be used as a binder, and organic solvent, such as diethyleneglycol and methyl ether, can also be used as a solvent.

The phosphor particles used in this embodiment are manufactured by a solid-phase firing method, aqueous solution reaction method, spray firing method, or hydrothermal synthesis method.

(1) Blue Phosphor

First, $Ba_{1-x}MgAl_{10}O_{17}:Eu_x$, a blue phosphor, is described. In a mixed solution fabrication process, materials, i.e. barium nitrate ($Ba(NO_3)_2$), magnesium nitrate ($Mg(NO_3)_2$), aluminum nitrate ($Al(NO_3)_3$), and europium nitrate ($Eu(NO_3)_2$) are mixed in a molar ratio of $Ba(NO_3)_2:Mg(NO_3)_2:Al(NO_3)_3:Eu(NO_3)_2 = 1-X:1:10:X$ ($0.03 \leq X \leq 0.25$). This mixture is dissolved in an aqueous medium to provide a mixed solution. As this aqueous medium, ion-exchange water or pure water is preferable because they contain no impurities. However, an aqueous medium containing non-aqueous solvent (e.g. methanol and ethanol) can also be used.

Next, the hydrate mixed solution is held in a container made of a corrosion- and heat-resistant material, such as gold and platinum. Then, the hydrate mixed solution is hydro-thermally synthesized in a high pressure vessel, using equipment capable of heating and pressurizing at the same time, such as an autoclave, for 12 to 20 hours, at specified temperatures (100 to 300° C.) under specified pressures (0.2 to 10 MPa).

Next, the obtained particles are fired in a reducing atmosphere containing 5% of hydrogen and 95% of nitrogen, for example, at a specified temperature for a specified period of time (e.g. at 1,350° C. for two hours). Thereafter, the fired particles are classified to provide a desired blue phosphor, $Ba_{1-x}MgAl_{10}O_{17}:Eu_x$.

The phosphor particles obtained by hydrothermal synthesis have spherical shapes and an average particle diameter ranging from approx. 0.05 to 2.0 µm, which is smaller than that of particles fabricated by the conventional solid-phase reaction method. Now, the term "spherical shape" as used herein is defined so that the aspect ratios (minor axis diameter/major axis diameter) of most of the phosphor particles range from 0.9 to 1.0, for example. However, not all the phosphor particles need to fall within this range.

Next, a description is provided of a process of providing water repellent finish in the vicinity of the side faces of Ba—O layers in this blue phosphor. Used as metal alkoxide is ethyl silicate $[Si(O—C_2H_5)_4]$ (where the amount of ethyl silicate is 0.01% of the phosphor). Used as a solvent is ethyl alcohol ($C_2H_5OH$) containing 0.015% of water. The phosphor, alkoxide, and solvent are stirred and mixed (for 2 to 24 hours). After the solvent is removed, the rest of the mixture is dried at a temperature of 100° C. The dried particles are fired (at temperatures ranging from 300 to 600° C. for 20 to 120 min.). The amount of the mixed solution and the phosphor is adjusted so that $SiO_2$ in an amount of 0.001 to 0.01 wt % of the phosphor adheres to the phosphor after firing.

Next, a description is provided of $Ba_{1-x-y}Sr_yMgAl_{10}O_{17}$:$Eu_x$, a blue phosphor This phosphor is made of materials different from those of the above $Ba_{1-x}MgAl_{10}O_{17}$:$Eu_x$, and fabricated by a solid-phase reaction method. The materials used are described hereinafter.

The materials, i.e. barium hydroxide ($Ba(OH)_2$), strontium hydroxide ($Sr(OH)_2$), magnesium hydroxide ($Mg(OH)_2$), aluminum hydroxide ($Al(OH)_3$), and europium hydroxide ($Eu(OH)_2$) are prepared in a required molar ratio. These materials are further mixed together with $AlF_3$, a fluxing agent. The mixture is fired at specified temperatures (1,300 to 1400° C.) for specified periods of time (12 to 20 hours), to provide $Ba_{1-x-y}Sr_yMgAl_{10}O_{17}$:$Eu_x$. The average diameter of the phosphor particles obtained by this method ranges from approx. 0.1 to 3.0 µm.

Next, the phosphor is fired in a reducing atmosphere containing 5% of hydrogen and 95% of nitrogen, for example, at specified temperatures (1,000 to 1,600° C.) for two hours and thereafter classified by an air classifier, to provide phosphor particles.

Next, water repellent finish is provided on the side faces of Ba—O layers in this phosphor. Used as a material for the water repellent finish is aluminum acetylacetone [Al$(C_5H_7O_2)_3$]. Used as a solvent is methanol ($CH_3OH$) containing 0.01% of water. These substances are mixed to fabricate a mixed solution. Next, the mixed solution is mixed well together with the phosphor, using a ball mill or other devices. After the alcohol is removed, the rest of the mixture is dried at a temperature of 100° C. The dried particles are fired (at temperatures ranging from 300 to 600° C. for 20 to 120 min.). The ratio of the mixed solution and the phosphor is adjusted so that $Al_2O_3$ in an amount of 0.001 to 0.01 wt % of the phosphor adheres thereto.

(2) Green Phosphor

First, a description is provided of $Zn_{2-x}SiO_4$:$Mn_x$, a green phosphor. In a mixed solution fabrication process, materials, i.e. zinc nitrate ($Zn(NO_3)$), silicon nitrate ($Si(NO_3)_2$), and manganese nitrate ($Mn(NO_3)_2$) are mixed in a molar ratio of $Zn(NO_3)$:$Si(NO_3)_2$:$Mn(NO_3)_2$=2−X:1:X(0.01≦X≦0.10). Next, this mixed solution is sprayed from a nozzle into a furnace heated to a temperature of 1,500° C. while ultrasonic waves are applied to the nozzle. Thus, the green phosphor is fabricated.

Next, a description is provided of $Ba_{1-x}Al_{12}O_{19}$:$Mn_x$, a green phosphor In a mixed solution fabrication process, materials, i.e. barium nitrate ($Ba(NO_3)_2$), aluminum nitrate ($Al(NO_3)_2$), and manganese nitrate ($Mn(NO_3)_2$), are mixed in a molar ratio of $Ba(NO_3)_2$:$Al(NO_3)_2$:$Mn(NO_3)_2$ =1−X: 12:X(0.01≦X≦0.10). This mixture is dissolved in ion-exchange water to provide a mixed solution.

Next, in a hydration process, an aqueous base (e.g. ammonia aqueous solution) is dropped into this mixed solution to form a hydrate. Thereafter, in a hydrothermal synthesis process, this hydrate and ion-exchange water are held in a capsule made of a corrosion- and heat-resistant material, such as platinum and gold. This mixed solution is hydro-thermally synthesized in a high-pressure vessel, using an autoclave, for example, at specified temperatures under specified pressures for specified periods of time (e.g. 100 to 300° C., 0.2 to 10 MPa, 2 to 20 hours).

Thereafter, the compound is dried to provide a desired $Ba_{1-x}Al_{12}O_{19}$:$Mn_x$. The phosphor obtained by this hydrothermal synthesis process has particle diameters ranging from approx. 0.1 to 2.0 µm and spherical shapes. Next, these particles are annealed in air at temperatures ranging from 800 to 1,100° C. and then classified, to provide the green phosphor.

(3) Red Phosphor

First, a description is provided of $(Y,Gd)_{1-x}BO_3$:$Eu_x$, a red phosphor In a mixed solution fabrication process, materials, i.e. yttrium nitrate ($Y_2(NO_3)_3$), hydro nitrate gadolinium ($Gd_2(NO_3)_3$), boric acid ($H_3BO_3$), and europium nitrate ($Eu_2(NO_3)_3$) are mixed in a molar ratio as an oxide of 1−X:2:X (0.05≦X≦0.20) and a ratio of Y:Gd=65:35. Next, this mixed solution is heat-treated in air at temperatures ranging from 1,200 to 1,350° C. for two hours and then classified, to provide the red phosphor.

Next, a description is provided of $Y_{2-x}O_3$:$Eu_x$, a red phosphor. In a mixed solution fabrication process, materials, i.e. yttrium nitrate ($Y_2(NO_3)_2$) and europium nitrate (Eu $(NO_3)_2$) are mixed in a molar ratio of $Y_2(NO_3)_2$:$(NO_3)_2$=2−X:X (0.05≦X≦0.30). This mixture is dissolved in ion-exchange water to provide a mixed solution. Next, in a hydration process, an aqueous base, such as ammonia aqueous solution, is added to this mixed solution to provide a hydrate. Thereafter, in a hydrothermal synthesis process, this hydrate and ion-exchange water are held in a container made of a corrosion- and heat-resistant material, such as platinum and gold. This mixture is hydro-thermally synthesized, in a high-pressure vessel, using an autoclave, for example, at temperatures ranging from 100 to 300° C., under pressures ranging from 0.2 to 10 MPa, for 3 to 12 hours. Then, the obtained compound is dried to provide a desired $Y_{2-x}O_3$:$Eu_x$.

Next, this phosphor is annealed in air at temperatures ranging from 1,300 to 1,400° C. for two hours and then classified, to provide the red phosphor. The phosphor obtained by this hydrothermal synthesis process has particle diameters ranging from approx. 0.1 to 2.0 µm and spherical shapes. These particle diameters and shapes are suitable for forming a phosphor layer having excellent light emission characteristics.

Phosphors without coating are used for phosphor layers 110R and 110G of the above PDP100. Used for phosphor layers 110B are phosphor particles in which water repellent finish is provided only in the vicinity of the side faces of Ba—O layers in the phosphor. Especially for the conventional blue phosphor, the luminance is lower and degradation in each process is severer than those of the blue phosphor of the present invention. Thus, the color temperature of white tends to decrease when the cells of three colors emit light at the same time. For this reason, in a plasma display device, the color temperature of white display has been improved by decreasing the luminance of phosphor cells of colors other than blue (i.e. red and green), using circuits. However, the use of a blue phosphor fabricated by a fabrication method of the present invention increases the luminance of blue cells and decreases luminance degradation in the panel manufacturing process. This eliminates the need of intentionally decreasing the luminance of the cells of other colors.

Thus, the luminance of the cells of all the colors needs not be intentionally decreased. Therefore, because the luminances of the cells of all the colors can fully be utilized, the luminance of a plasma display device can be increased while the color temperature at white display is kept high. Of course, coating the phosphor of all the colors can further improve the characteristics of a PDP.

The blue phosphor of the present invention can be applied to fluorescent lighting that is excited by ultraviolet light to emit light in a similar manner. In this case, conventional blue phosphor particles applied to the inner wall of a fluorescent tube is replaced with a phosphor layer made of a blue phosphor subjected to water repellent finish. Application of the present invention to fluorescent lighting in this manner can provide fluorescent lighting having a luminance and resistance to luminance degradation more excellent than those of the conventional fluorescent lighting.

EXAMPLES

In order to evaluate the performance of a plasma display device of the present invention, samples based on the preferred embodiment were produced and performance evaluation tests were performed on the samples. The experimental results are described below.

Each of the plasma display devices produced has a diagonal size of 42 in. (for a HDTV screen having a rib pitch of 150 μm). Each of the plasma display devices was produced so that the dielectric glass layer was 20 μm thick, the MgO protective layer was 0.5 μm thick, and the distance between the display electrode and the display scan electrode was 0.08 mm. The discharge gas filling discharge space essentially consists of neon and. contains 5% of xenon gas mixed therein.

Used as the blue phosphor particles of each of Sample Nos. 1 though 10 for the plasma display devices is a phosphor in which the vicinity of the side faces of Ba—O layers is coated with an oxide or a fluorine-containing oxide. The synthesis conditions are shown in Table 1.

TABLE 1

| Sample No | Amount of Eu x | Manufacturing Method | Material for coating Ba—O layers | Amount of Eu x | Manufacturing method | Coating material | Amount of Mh x | Manufacturing method | Coating material |
|---|---|---|---|---|---|---|---|---|---|
| | Blue Phosphor $Ba_{1-x}MgAl_{10}O_{17}:Eu_x$ | | | Red Phosphor $(Y, Gd)_{1-x}BO_3:Eu_x$ | | | Green Phosphor $(Zn_{2-x}Mn_x)_2SiO_4$ | | |
| 1 | x = 0.03 | Hydrothermal synethesis method | $SiO_2$ | x = 0.1 | Solid-phase reaction method | No coating | x = 0.01 | Spray method | No coating |
| 2 | x = 0.05 | Solid-phase reaction method (Flux method) | $Al_2O_3$ | x = 0.2 | Spray method | No coating | x = 0.02 | Hydrothermal synthesis method | No coating |
| 3 | x = 0.1 | Spray method | ZnO | x = 0.3 | Aqueous solution reaction method | No coating | x = 0.05 | Solid-phase reaction method (Flux method) | No coating |
| 4 | x = 0.2 | Aqueous solution reaction method | $MgAl_2O_4$ | x = 0.15 | Hydrothermal synthesis method | No coating | x = 0.1 | Solid-phase reaction method (Flux method) | No coating |
| | Blue Phosphor $Ba_{1-x-y}Sr_yMgAl_{10}O_{17}:Eu_x$ | | | Red Phosphor $(Y_{1-x})_2O_3:Eu_x$ | | | Green Phosphor $Ba_{1-x}Al_{12}O_{19}:Mn_x$ | | |
| 5 | x = 0.03, y = 0.1 | Solid-phase reaction method (Flux method) | $La_2O_3$ | x = 0.01 | Hydrothermal synthesis method | No coating | x = 0.01 | Hydrothermal synthesis method | No coating |
| 6 | x = 0.1, y = 0.3 | Hydrothermal synethesis method | $LaPO_4$ | x = 0.01 | Spray method | No coating | x = 0.02 | Spray method | No coating |
| 7 | x = 0.1, y = 0.5 | Spray method | $Zn_2SiO_4$ | x = 0.15 | Aqueous solution reaction method | No coating | x = 0.05 | Solid-phase reaction method | No coating |
| 8 | x = 0.2, y = 0.3 | Solid-phase reaction method | $Si(O-F)_2$ | x = 0.2 | Solid-phase reaction method | No coating | x = 0.1 | Solid-phase reaction method | No coating |
| 9 | x = 0.2, y = 0.3 | Solid-phase reaction method | $La2(O-F)_3$ | x = 0.2 | Solid-phase reaction method | No coating | x = 0.1 | Solid-phase reaction method | No coating |
| 10 | x = 0.1, y = 0.5 | Solid-phase reaction method | $Al_2(O-F)_3$ | x = 0.15 | Aqueous solution reaction method | No coating | x = 0.01 | Hydrothermal synthesis method | No coating |
| 11* | x = 0.1, y = 0.5 | Solid-phase reaction method (Flux method) | No coating | x = 0.15 | Aqueous solution reaction method | No coating | x = 0.01 | Hydrothermal synthesis method | No coating |
| 12* | x = 0.1, y = 0.5 | Solid-phase reaction method | No coating | x = 0.15 | Aqueous solution reaction method | No coating | x = 0.01 | Hydrothermal synthesis method | No coating |
| 13* | x = 0.1, y = 0.5 | Solid-phase reaction method | Coating entire surface with $Al_2(O-F)_3$ | x = 0.15 | Aqueous solution reaction method | No coating | x = 0.01 | Hydrothermal synthesis method | No coating |

*Sample Nos. 11, 12 and 13 show comparative examples

For each of Sample Nos. 1 through 4, $(Y,Gd)_{1-x}BO_3:Eu_x$ red phosphor, $Zn_{2-x}SiO_4:Mn_x$ green phosphor, and $Ba_{1-x}MgAl_{10}O_{17}:Eu_x$ blue phosphor are used in combination. The methods of synthesizing the phosphors, and the substitution ratios of Eu and Mn mainly emitting light, i.e. the substitution ratios of Eu to the elements Y and Ba and the substitution ratios of Mn to the element Zn, are changed as shown in Table 1.

For each of Sample Nos. 5 through 10, $Y_{2-x}O_3:Eu_x$ red phosphor, $Ba_{1-x}Al_{12}O_{19}:Mn_x$ green phosphor, and $Ba_{1-x-y}Sr_yMgAl_{10}O_{17}:Eu_x$ blue phosphor are used in combination. Similar to the above case, the conditions for the method of synthesizing the phosphors, and the substitution ratios of the elements mainly emitting light are changed as shown in Table 1.

Phosphor ink used for forming phosphor layers is prepared by using each kind of phosphor particles shown in Table 1, and mixing the phosphor, a resin, solvent and dispersion agent. According to the measurement results, viscosity of each kind of the phosphor ink (at 25° C.) is kept within the range of 1,500 to 30,000 CP. According to observations of each phosphor layer formed, the phosphor ink is uniformly applied to the side faces of the barrier ribs.

As for the phosphor particles used for phosphor layers of each color, those having an average diameter ranging from 0.1 to 3.0 μm and a maximum diameter up to 8 μm are used in each sample.

Next, a description is provided of Comparative Sample Nos. 11, 12, and 13. The phosphor particles of each color in Sample Nos. 11 and 12 are subjected to no water repellent finish. For Sample No. 13, the blue phosphor is coated with $Al_2(O\text{---}F)_3$ on its entire surface and phosphors of the other colors are not coated.

Experiment 1

Model experiments were performed on Sample Nos. 1 through 10 and Comparative Sample Nos. 11, 12, and 13 to determine luminances and luminance degradation factors. In the model experiments, these phosphors were fired (520° C., 20 min.) in the rear panel manufacturing process to determine how the luminance of each color changed. The luminance of the particles before firing and the luminance of the applied paste after firing were measured. The luminance degradation factor of each color obtained before and after firing was measured.

Experiment 2

Measured was the luminance degradation factor of each phosphor obtained before and after the panel sealing step (at 450° C. for 20 min.) in the panel manufacturing process.

Experiment 3

When each panel was lit in each color, a luminance and a luminance degradation factor were measured as follows. Discharge sustain pulses at a voltage of 200V and at a frequency of 100 kHz were applied to each plasma display device continuously for 100 hours, and luminances of each panel was measured before and after the application of the pulses. From the measurements, a luminance degradation factor (([luminance after application−luminance before application]/luminance before application)*100) was determined.

Addressing failure at address discharge was determined by existence of flickers in an image. If flickers were found even only in one position, it was recognized as having flickers. As for the luminance distribution of each panel, a luminance at white display was measured with a luminance meter, and the distribution on the entire surface was shown.

Shown in Table 2 are the luminances and the luminance degradation factors of each color, as a result of these experiments 1 through 3.

TABLE 2

| Sample No. | Luminance degradation factor (%) of phosphor fired (520° C.) in rear panel manufacturing process | | | Luminance degradation factor (%) of phosphor when panels are sealed (450° C.) in panel sealing process | | | Luminance degradation factor (%) of phosphor after application of discharge sustain pulses (200 V, 100 KHz, 100 hours) | | | Existence of addressing failure at address discharge | Luminance at blue display on the entire surface cd/cm² |
|---|---|---|---|---|---|---|---|---|---|---|---|
| | Blue | Red | Green | Blue | Red | Green | Blue | Red | Green | | |
| 1 | −0.6 | −1.2 | −4.9 | −4.8 | −2.6 | −13.0 | −3.5 | −4.4 | −14.5 | Not exist | 79.2 |
| 2 | −0.8 | −1.3 | −4.0 | −4.2 | −2.4 | −13.2 | −4.3 | −4.1 | −14.2 | Not exist | 82.2 |
| 3 | −0.9 | −1.4 | −4.5 | −2.8 | −2.3 | −12.9 | −4.5 | −4.0 | −14.6 | Not exist | 88.2 |
| 4 | −0.8 | −1.4 | −4.7 | −2.9 | −2.2 | −12.7 | −4 | −4.2 | −14.1 | Not exist | 88.2 |
| 5 | −0.5 | −1.5 | −4.9 | −2.8 | −2 | −12.9 | −3.8 | 4.3 | −14.8 | Not exist | 85.8 |
| 6 | −1.2 | −1.2 | −4.3 | −2.5 | −2.3 | −12.6 | −3.9 | −4.1 | −14.9 | Not exist | 88.8 |
| 7 | −08 | −1.4 | −4.5 | −2.7 | −2.4 | −12.343 | −4.1 | −4.209 | −14.7 | Not exist | 87 |
| 8 | −6 | −1.2 | −4.3 | −2.8 | −2.5 | −12.5 | −4.3 | −4.3 | −15.1 | Not exist | 91.2 |
| 9 | −0.5 | −1.5 | −4.1 | −2.4 | −2.1 | −12.8 | −3.9 | −4.1 | −15.6 | Not exist | 91.8 |
| 10 | −0.7 | −1.3 | −4.2 | −2.3 | −2.3 | −13.0 | −3.8 | −4.1 | −14.8 | Not exist | 88.8 |
| 11* | −5.5 | −1.5 | −4.1 | −21.5 | −2.1 | −13.2 | −35 | −4.1 | −15.6 | exist | 45.8 |
| 12* | −6 | −1.3 | −4.2 | −22.3 | −2.3 | −13.5 | −34.1 | −4.2 | −15.8 | exist | 45.5 |
| 13* | −0.4 | −1.3 | −4.2 | −4.8 | −2.3 | −13.2 | −36 | −4.2 | −14.8 | Not exist | 69 |

*Sample Nos. 11, 12 and 13 show comparative examples.

As shown in Table 2, for Sample Nos. 11, 12, and 13, in those including blue phosphors subjected to no water repellent finish, the luminance degradation factors in each process are large. Especially for the blue phosphors, luminance degradation factors ranging from 5.5 to 6.0% are seen in the phosphor firing process, 21.5 to 22.3% in the sealing process, and 34.1 to 35% in acceleration life tests (200V, 100 kHz). In contrast, for Sample Nos. 1 through 10, all the degradation factors of the blue phosphors are up to 5%. Additionally, no addressing failure is found. The luminance degradation factor of Comparative Sample No. 13 in which the blue phosphor is coated with $Al_2(O\text{---}F)_3$ on its entire surface has almost no difference from that of Sample No. 10 in which the vicinity of the side faces of Ba—O layers is coated with $Al_2(O—F)_3$, in each process. However, it is found that the luminance of Comparative Example No. 13 is considerably lower than that of Sample No. 10 when only the blue cells are lit.

This is because coating only the vicinity of the side faces of Ba—O layers in a blue phosphor with a water repellent oxide or fluorine-containing oxide prevents defective layers (Ba—O layers) on the surface of a phosphor from adsorbing water included in the environment in firing the phosphor or water in MgO, barrier ribs, sealing frit, and the phosphor in sealing panels. Further, because coating is provided only on the side faces of Ba—O layers, the luminance of blue color is higher than that of a phosphor coated on its entire surface.

Experiment 4

Effect of Water Repellent Finish

As model experiments, a blue phosphor in which water repellent finish is provided only in Ba—O layers, and a blue phosphor subjected to no water repellent finish were left in an atmosphere at a temperature of 60° C. and a relative humidity of 90% for 10 min., and dried at a temperature of 100° C. Thereafter, temperature-programmed desorption gas chromatograph-mass spectrometry (TDS analysis) was performed on these phosphors. The analysis results show that the peaks of physically adsorbed water (approx. 100° C.) and chemically adsorbed water (300 to 500° C.) of the samples subjected to water repellent finish (Sample Nos. 1 through 10) are considerably lower than those of the comparative samples (Sample Nos. 11 and 12).

Experiment 5

In the Experiment 1, blue phosphors of the present invention are used in plasma display devices. Samples of fluorescent lighting using a blue phosphor of the present invention were produced for fluorescent lighting that is excited by ultraviolet light to emit light in a similar manner.

Phosphors of each color produced under the condition of Sample No. 7 of Table 1 were mixed and the mixture was applied to the inner wall of a glass tube, as a phosphor layer of known fluorescent lighting, to provide Fluorescent Lighting Sample No. 14. As a comparative example thereof, phosphors of each color produced by a conventional solid-phase reaction method under the condition of Sample No. 11 (of Table 1) without water repellent finish were also mixed and the mixture was applied to form a phosphor layer. Thus, Fluorescent Lighting Comparative Sample No. 15 was provided in a similar manner. Table 3 shows the results.

TABLE 3

| Sample Mo. | Phosphor | Luminance (cd/m$^2$) | Luminance degradation after 5000 hours (100 V, 60 Hz) |
|---|---|---|---|
| 14 | Phosphor of Sample No.7 | 6500 | –0012% |
| 15* | Phosphor of Sample No.11 | 6600 | –14.6% |

*Sample Nos. 11, 12, and 13 show comparative examples.

Industrial Applicability

As described above, the present invention provides a phosphor that contains blue phosphor particles constituting a phosphor layer in which the vicinity of the sides of the planes of mirror symmetry in Ba—O layers is selectively coated with an oxide or fluorine-containing oxide. This phosphor can prevent degradation of the phosphor layer in each process and improve luminance, life and reliability of a panel and a lamp.

The invention claimed is:

1. A plasma display device having a plasma display panel in which a plurality of discharge cells having one or plural colors are disposed, phosphor layers having a color corresponding to said respective discharge cells are disposed, and said phosphor layers are excited by ultraviolet light to emit light, wherein said phosphor layers have a compound blue phosphor represented by one of $Ba_{1-x}MgAl_{10}O_{17}:Eu_x$ and $Ba_{1-x-y}Sr_yMgAl_{10}O_{17}:Eu_x$, and said blue phosphor has at least one of, $MgAl_2O_4$, $La_2(O—F)_3$, and $Al_2(O—F)_3$ coating at least a vicinity of a side of planes of mirror symmetry in a layer containing a Ba atom.

2. A blue phosphor excited by ultraviolet light to emit visible light, and made of one of crystal structures $Ba_{1-x}MgAl_{10}O_{17}:Eu_x$ and $Ba_{1-x-y}Sr_yMgAl_{10}O_{17}:Eu_x$, wherein at least a vicinity of a side of planes of mirror symmetry in a layer containing a Ba atom in said blue phosphor is coated with one or more compound selected from the group consisting of, $MgAl_2O_4$, $La_2(O—F)_3$, and $Al_2(O—F)_3$.

3. A method of manufacturing a phosphor comprising: a step of fabricating a coprecipitation compound by dissolving nitrate containing elements for composing a blue phosphor in water and adding an alkali;
a step of fabricating any one phosphor of $Ba_{1-x}MgAl_{10}O_{17}:Eu_x$ and $Ba_{1-x-y}Sr_yMgAl_{10}O_{17}:Eu_x$ by baking the coprecipitation compound;
a step of surface-treating the phosphor in a weak acidic aqueous solution; and
a step of coating at least a vicinity of a side of planes of mirror symmetry in a layer containing a Ba atom in the phosphor with at least one of, $MgAl_2O_4$, $La_2(O—F)_3$, and $Al_2(O—F)_3$.

4. A method of manufacturing a phosphor comprising: a mixed solution fabrication step of mixing a material and an aqueous medium, to fabricate a mixed solution; a precursor fabrication step of fabricating a precursor of one of blue phosphors $Ba_{1-x}MgAl_{10}O_{17}:Eu_x$ and $Ba_{1-x-y}Sr_yMgAl_{10}O_{17}:Eu_x$ by mixing the mixed solution and an aqueous base; a hydrothermal synthesis step of performing a hydrothermal synthesis reaction on a solution containing the precursor and alkali water mixed therein at temperatures ranging from 100 to 350° C. under pressures ranging from 0.2 to 25 MPa; a step of annealing a blue phosphor obtained by said hydrothermal synthesis at temperatures ranging from 1,350 to 1,600° C. in a nitrogen atmosphere containing hydrogen; and a step of classifying a blue phosphor obtained by said annealing step; and a step of coating at least a vicinity of a side of planes of mirror symmetry in a layer containing a Ba atom in a phosphor selected by said classifying step with one of an oxide and a fluorine-containing oxide.

5. The method of manufacturing a phosphor of claim 4, wherein said one of an oxide coating and a fluorine-containing oxide coating is at least one of $SiO_2$, $Al_2O_3$, ZnO, $MgAl_2O_4$, $La_2O_3$, $LaPO_4$, $Zn_2SiO_4$, $Si(O—F)_2$, $La_2(O—F)_3$, and $Al_2(O—F)_3$.

6. A method of manufacturing a phosphor comprising: dispersing one of blue phosphors $Ba_{1-x}MgAl_{10}O_{17}:Eu_x$ and $Ba_{1-x-y}Sr_yMgAl_{10}O_{17}:Eu_x$, and an organic compound containing at least one of Si, Al, La, Zn, P and F, in a solution having a water concentration up to 0.025%, and thereby coating at least a vicinity of a side of planes of mirror symmetry in a layer containing a Ba atom in the blue phosphor with one of an oxide and a fluorine-containing oxide.

7. The method of manufacturing a phosphor of claim 6, wherein the solution having a water concentration up to 0.025% is an alcohol.

8. The method of manufacturing a phosphor of claim 6, wherein the organic compound containing at least one of Si, Al, La, P and Zn is an alkoxide compound [M(O—R)n] of these metals (where M is at least one of Si, Al, La, P, and Zn, R is $C_nH_{2n+1}$, and n is an integer).

9. The method of manufacturing a phosphor of claim 6, wherein the organic compound containing at least one of Si, Al, La, P, Zn and F is one of an acetylacetone compound [$M(C_6H_7O)_2$] and a hexafluoro acetylacetone compound [$M(C_5H_6O_2)$] of these metals (where M is at least one of Si, Al, La, P, and Zn).

10. The method of manufacturing a phosphor of claim 6, wherein the organic compound containing fluorine is silicofluoric acid ($H_2SiF_4$).

* * * * *